W. C. ALBERS.
PICTURE PROJECTING MACHINE.
APPLICATION FILED AUG. 10, 1917.
1,352,420.
Patented Sept. 14, 1920.
4 SHEETS—SHEET 1.
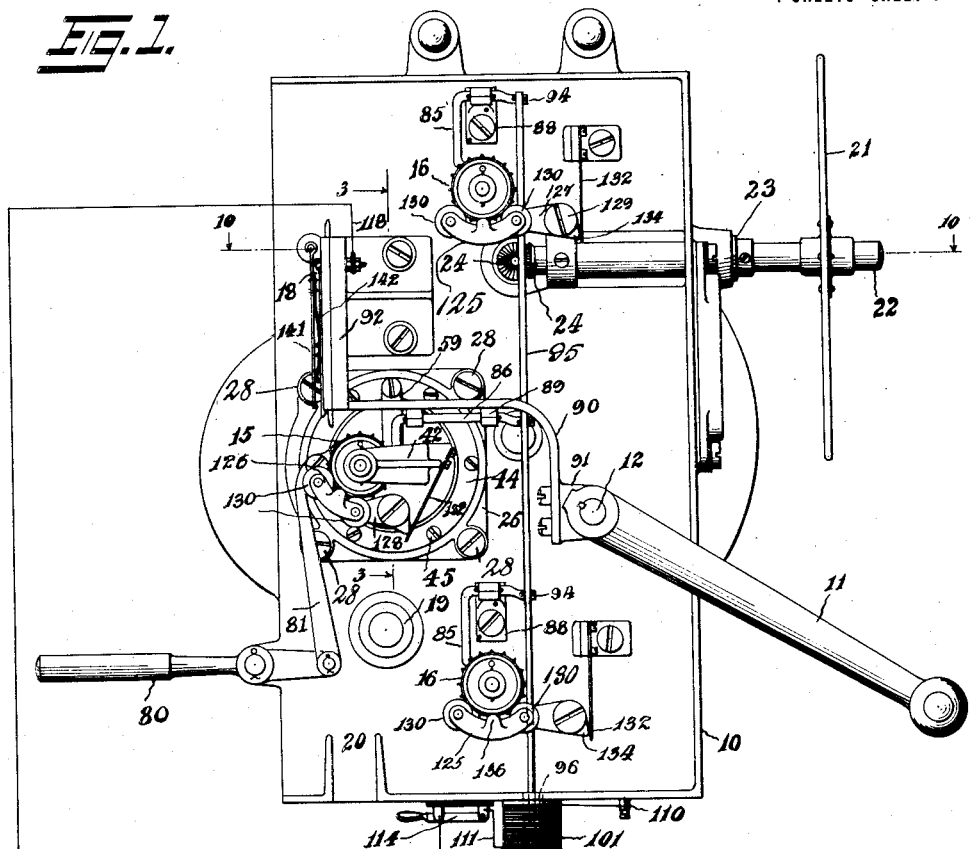
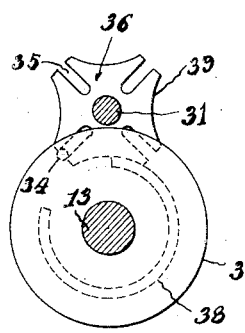
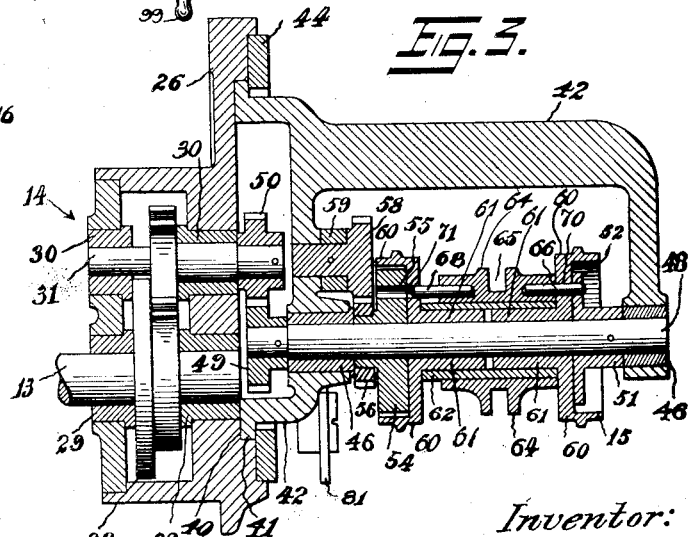
Witnesses:
Frank L. Faggiani
H. D. Penney
Inventor:
William C. Albers,
By his Atty. F. H. Richards

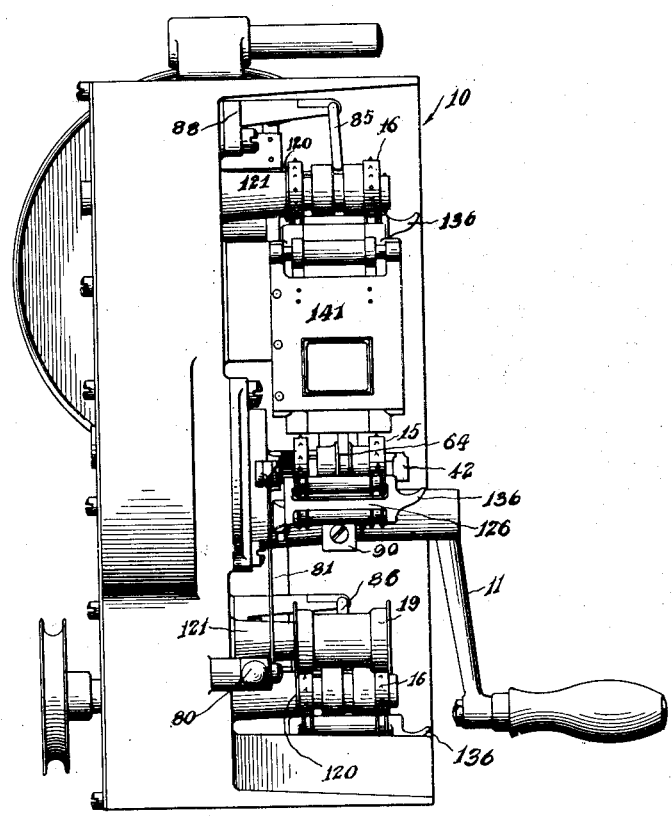
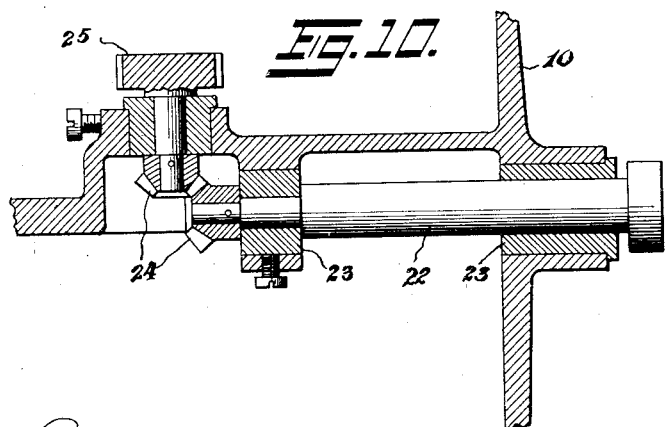

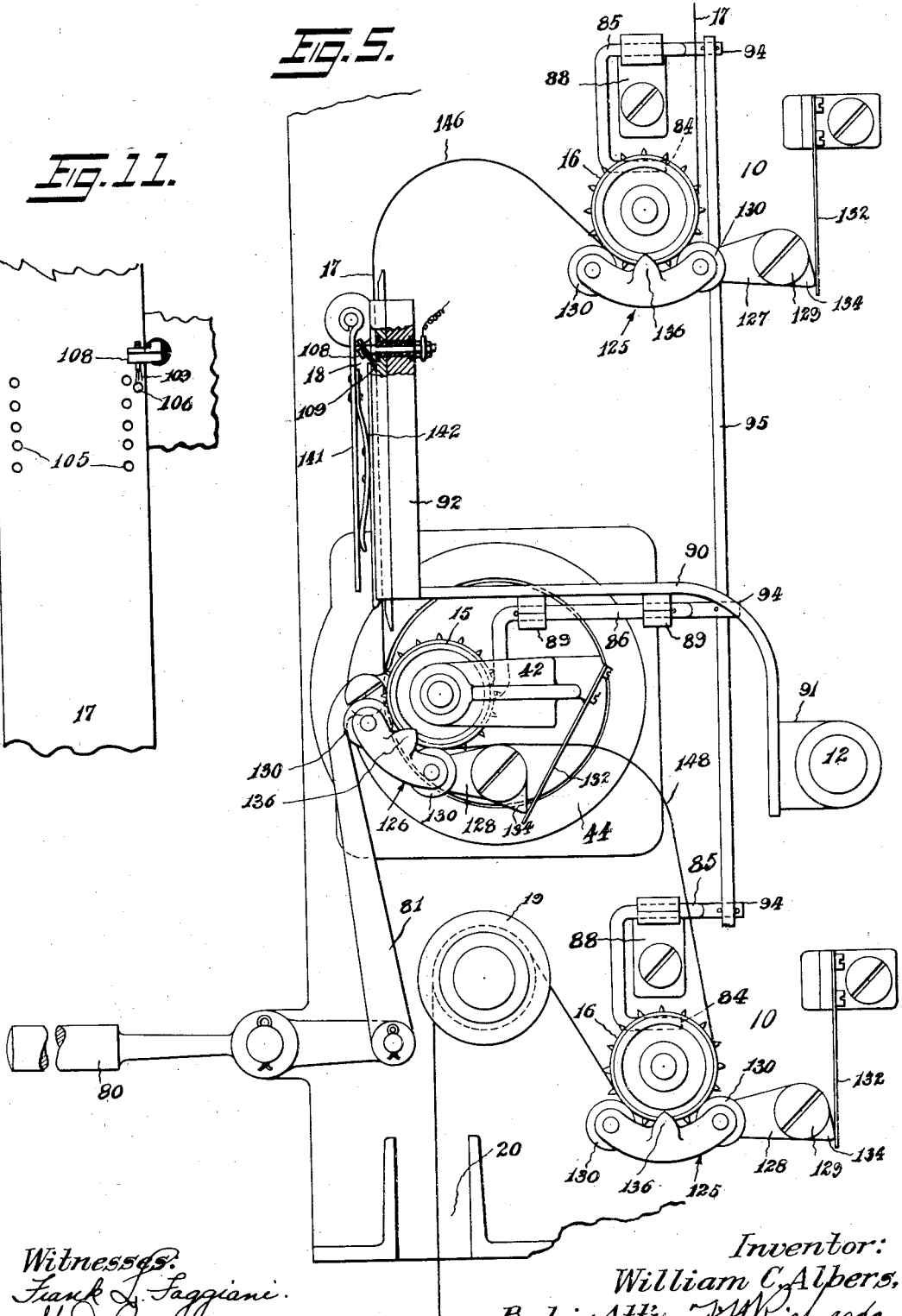
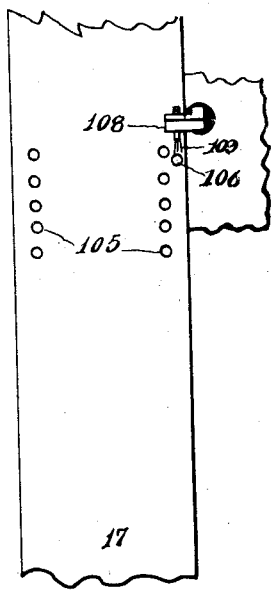

W. C. ALBERS.
PICTURE PROJECTING MACHINE.
APPLICATION FILED AUG. 10, 1917.
1,352,420.
Patented Sept. 14, 1920.
4 SHEETS—SHEET 4.
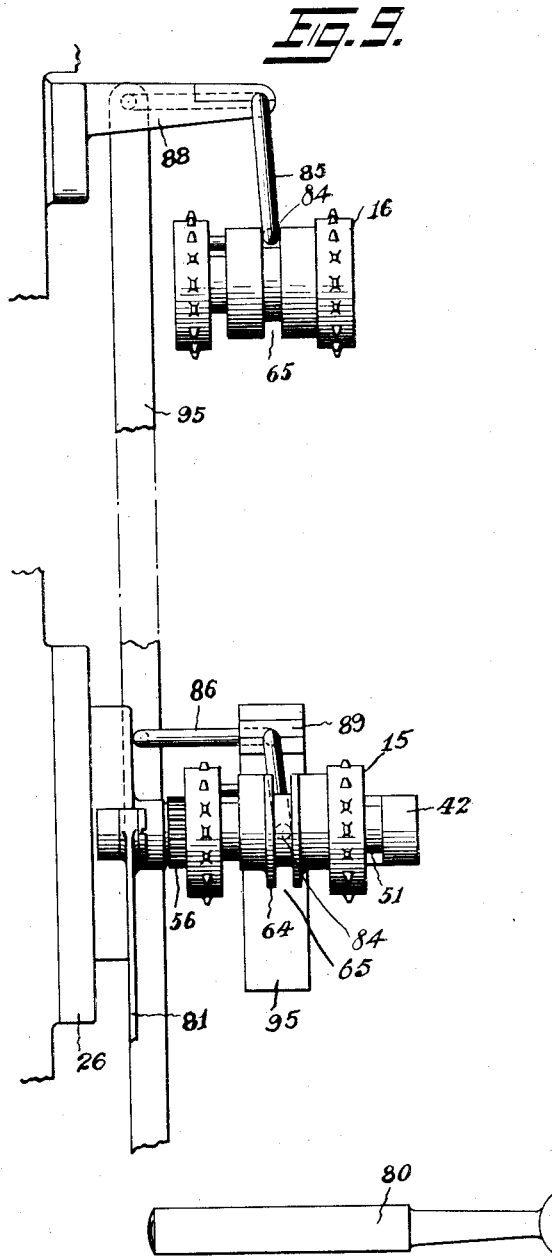
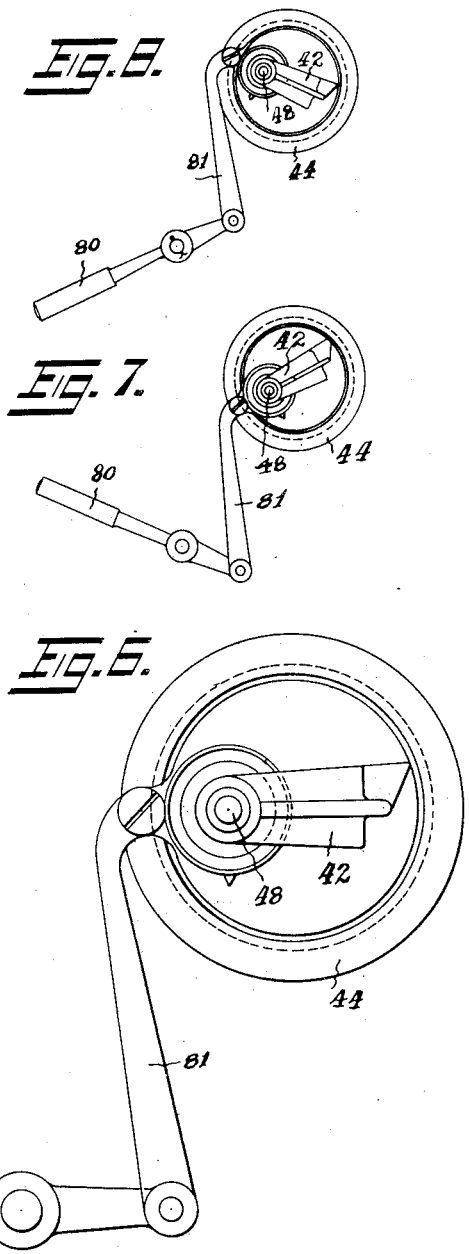
Witnesses:
Inventor:
William C. Albers,
By his Att'y,

UNITED STATES PATENT OFFICE.

WILLIAM C. ALBERS, OF NEW YORK, N. Y., ASSIGNOR TO ALBERT F. PIERCE, OF BROOKLYN, NEW YORK.

PICTURE-PROJECTING MACHINE.

1,352,420.

Specification of Letters Patent. Patented Sept. 14, 1920.

Application filed August 10, 1917. Serial No. 185,456.

*To all whom it may concern:*

Be it known that I, WILLIAM C. ALBERS, a citizen of the United States, residing in New York city, in the county of New York and State of New York, have invented certain new and useful Improvements in Picture-Projecting Machines, of which the following is a specification.

This invention relates to improvements in motion picture projecting machines, and has for one of its objects to provide means for automatically or otherwise stopping the film when a title or insert of reading matter is reached for projection and for holding the film in this position until time has been given for reading the insert, the mechanism other than the film feeding mechanism not being arrested while the film feeding mechanism is stopped. In this way, a great saving in footage of the film is effected, since no matter how much time may be required for reading the insert, only a few exposures are necessary to project it a sufficient length of time.

Another object of my invention is to provide suitable mechanism for framing the picture, whether the film be in motion or at rest. When the film is stopped by the feed arresting mechanism, it may be that the picture will not accurately be framed, but the framing mechanism, which I have provided, permits the picture to be easily and quickly framed. This framing mechanism is not only suitable for framing the picture when the feed mechanism is arrested but is also suitable for framing the picture when the film is being fed, and this framing takes place without in any way changing the speed of the feed or removing the film from the sprockets.

Other objects of the invention will appear as the description proceeds; and while herein I have described minute details of my machine, it is understood that the invention is not limited to these, as the details of construction and combination may be greatly varied without departing from the spirit and scope of the invention.

In the accompanying drawings, showing by way of example, one of many possible embodiments of the invention, Figure 1 is the side elevation of a machine embodying my inventions;

Fig. 2 is a rear elevation of the same;

Fig. 3 is a horizontal fragmental sectional view drawn on a larger scale taken approximately on the line 3—3 of Fig. 1 showing the details of the framing mechanism and the Geneva drive for driving the film sprocket.

Fig. 4 is a detail elevation showing the Geneva drive;

Fig. 5 is a fragmental side elevation showing the framing mechanism and the feed arresting mechanisms on a larger scale;

Fig. 6 is a side elevation on an enlarged scale showing one position of the framing mechanism.

Figs. 7 and 8 are similar views, on a smaller scale, showing other positions of the framing mechanism.

Fig. 9 is a fragmental elevation showing the connections between the feed arresting mechanisms of the several feed sprockets;

Fig. 10 is a fragmental horizontal sectional view taken on the line 10—10 of Fig. 1, and Fig. 11 is a front elevation of the film gate.

My improvements are shown embodied in a machine having a main frame 10, Fig. 2 on which is mounted the various mechanisms of the machine. Many of the parts of the machine are of usual construction and are, therefore, not described or illustrated in detail in the present specification.

The machine is provided with a drive crank 11 mounted on the main shaft 12 connected by suitable mechanism not shown to the drive-shaft 13 (Fig. 3) of the Geneva drive 14, which drives the framing feed sprocket 15 Figs. 1, 2 and 5. The upper and lower feed sprockets 16 are driven from the main drive-shaft 12 by suitable intermediate drive mechanisms also not shown.

The film 17 Fig. 5 is drawn from a supply reel above the machine and passed under the upper sprocket 16, thence through the film gate 18, under the framing sprocket 15, under the lower sprocket 16, over the idler 19 and out through the flame gate 20 to a take up reel not shown.

The shutter 21 is mounted on the shaft 22 rotatable in bearings 23 carried on the main frame (Fig. 10) and is driven by bevel gears 24 driven by the spur-gear 25 driven from the main shaft 12 by mechanism not shown.

This, however, forms no part of present invention.

The Geneva case 26 is secured by means of screws 28 to the main frame of the machine, and is provided with bearings 29 and 30 Fig. 3 carrying the drive-shaft 13 of the Geneva drive and the countershaft 31 thereof. On the shaft 13 is carried the pinwheel 32 carrying the drive pin 34 (Fig. 4), adapted to engage in the slots 35 between the arms of the Geneva cross 36 carried on said countershaft 31. The wheel 32 also carries the locking flange 38 adapted to engage the curved arms 39 of the Geneva cross for locking the cross in position between each increment of its movement.

The outer face of the Geneva case is provided with an annular seat 40 in which is received the annular flange 41 of the rotatable frame bracket 42 rotatably mounted in said seat and held in place by means of a locking ring 44 secured to the Geneva case by screws 45 (Fig. 1) and bearing against said flange forward. The axis of rotation of the frame bracket 42 is coaxial with the countershaft 31.

The bracket 42 is provided with a pair of alined bearings 46 in which is rotatably mounted a sprocket shaft 48 having fixed thereto at its inner end a spur-gear 49 in connection with a similar gear 50 fixed on the countershaft 31. From this it will be seen that, since the axis of rotation of the frame 42 is coaxial with the shaft 31, the shaft 31 will drive the sprocket shaft 48 in any position of rotation of the frame 42.

Near the outer end of the sprocket shaft 48 there is fixed a flanged drive collar 51 Fig. 3 in the flange of which is provided a perforation 52. Near the inner end of the sprocket shaft 48 there is loosely mounted a collar 54 provided with a perforation 55 and with gear teeth 56 adapted to mesh with the pinion 58 coaxial with the countershaft 31, and fixed to a small bracket 59 fixed on the ring 44 (Fig. 1).

The sprocket 15 is loosely mounted on the shaft 48 between the collars 51 and 54 and comprises identical end portions, each end portion consisting of an enlarged portion 60 and a smaller portion 61 integral therewith or fixedly attached thereto, said end portions being firmly held together by means of a sleeve 62 forced upon said small portions 61 and forming a reduced intermediate portion on which is slidably mounted a clutch collar 64 provided with an intermediate annular groove 65 and with oppositely projecting clutch pins or dogs 66 and 68 adapted to pass through perforations 70 and 71 in said enlarged ends 60. When said clutch collar 64 is moved outwardly the pin 66 engages in the perforation 52, and the sprocket wheel becomes fixed with the shaft 48. On the other hand, when the clutch collar 64 is moved inwardly the pin 68 engages in the perforation 55, and at the same time the pin 66 disengages from the perforation 52. It will thus be seen that when the clutch collar 64 is moved inwardly, the sprocket 70 becomes fixed with the collar 54, and is therefore, held against rotation by means of said collar and pin 68 which, as stated, is held against rotation by means of the bracket 59.

When the sprocket is thus fixed relative to the collar 54, it will be easily seen that upon any slight rotation of the frame 42, the sprocket 15 will rotate slowly entirely independently of the shaft 48, thus moving the portion of the sprocket on which the film is engaged relatively toward or away from the film gate 18 thereby framing the picture, should it not be in register with the film gate. This rotation of the frame is accomplished by means of the hand-lever 80 (Figs. 1 and 5) fulcrumed on the frame of the machine and connected to the rotatable frame 42 by means of a link 81.

Now will be described the mechanism for shifting the clutch collar 64 to the right or left for engaging the sprocket with or disengaging it from the drive mechanism. The sprockets 16 Fig. 9 are similar in construction to the sprocket 15 and are driven by the main gear transmission, and are each provided with the collar groove 65. In this groove engages the horizontal end 84 of the levers 85 and 86, the former being mounted upon brackets 88 fixed upon the main frame of the machine, while the lever 86 is mounted in ears 89 carried on a support 90 fixed on a boss 91, the support 90 at its other end being fixed on the film gate bracket 92. The forward ends of the levers 85 and 86, are provided with cranks 94, the three ends of which are received in holes in the vertical lever-operating bar 95, which preferably is of non-magnetic material. The lever-operating bar 95, connects these three cranks and extends downwardly through the opening 96, and the bottom of the main frame, and is provided at its lower end with a core 98, of soft iron terminating in a handle 99.

The said core 98 is disposed, when in its lowest position, just below the opening 100 within the solenoid 101, and when in this position the levers 85 and 86 are set to hold the clutch collars 64 in an outward position, as shown in Fig. 3, which is the position for rotating the sprockets and feeding the film.

Means for energizing the solenoid for causing the core 98 and the bar 95 to be drawn upwardly for disconnecting the drive mechanism from the sprockets will now be described.

The film 17 is provided with perforations 105.

In addition to the perforations 105 (Fig. 11) which are engaged by the sprockets when feeding the film, the film is provided, somewhat in advance of the point where the film is to be arrested, with a special control perforation 106. At one side of the film gate, upon the film gate bracket 92 there is mounted a brush standard 108 (Figs. 5 and 11) suitably insulated from the film gate bracket and adjustably carrying a flexible brush 109 adapted to contact the edge of the film outside of the path of the perforations 105, and in the path of the special perforation 106. When the special perforation reaches the brush 109 contact is made between this brush and the film gate bracket 92 which is of electrically conducting material and grounded on the frame of the machine.

As shown in Fig. 1, one end of the insulated wire of the solenoid 101 is grounded at 110 on the frame of the machine, while the other end is connected, through the conductor 111, the hand switch 114, the conductor 115, the source of current 116 and the conductor 118, with the brush standard 108.

Therefore, as is evident, when the special perforation 106 reaches the flexible brush 109 and contact made the solenoid 101 will be energized, thus drawing the core upwardly into the opening 100, whereupon all of the clutch collars 64 Fig. 3 will be moved inwardly thus disconnecting the sprockets from the drive mechanism and fixing the sprocket 15 to the collar 54, and fixing the sprockets 16 to similar fixed collars 120 fixed to the brackets 121 in turn fixed to the main frame of the machine.

After the insert of reading matter has been exposed upon the screen as long as the operator thinks necessary, it is merely necessary for the operator to pull down upon the handle 99, thus drawing with it the bar 95, and again connecting the sprockets to the drive mechanism, whereupon the feeding of the film is continued. Instead of pulling down upon the handle 99, the operator may merely open the switch 114, whereupon the core 98 will fall of its own weight and the sprocket be again engaged with the driving mechanism. The switch 114, is also useful for cutting out of operation the arresting mechanism when desired.

To avoid fire risk due to exposure of a certain portion of the film, a suitable fireproof film preferably is used, instead of the customary celluloid film.

For holding the film upon the sprockets the upper and lower tension shoes 125 Figs. 1 and 5 and the intermediate shoe 126 are provided. These comprise brackets 127 and 128, the brackets 127 being pivoted as at 129 to the frame of the machine while the bracket 128 also is pivoted to the main frame 10. Upon each bracket is rotatably mounted a pair of tension rollers 130 adapted to press the film against the sprocket wheel. For each bracket there is provided a spring 132 pressing against the nose 134 for yieldably pressing the shoe toward the sprockets; and each tension shoe is provided with a thumb-piece 136 for moving the tension shoe toward or away from the sprocket. When the tension shoe is carried far enough away from the sprocket, the spring 132 engages the lower face of the nose 134 and, therefore, holds the tension shoe away from the sprocket. In this position the film may be threaded upon the sprockets, and when the film is properly adjusted the tension shoes are moved to pressing position causing the film to be held upon the sprocket.

The film is threaded upon the machine as explained being passed through the film gate under the tension plate 141, which is pressed against the film by means of the spring 142.

The operation of the machine has already been explained and need be only briefly summarized as follows:—

After the film has been threaded as above described, taking particular care to provide surplus film as at loops 146 and 148 Fig. 5 the operator proceeds to feed the film and project the pictures upon the screen in the usual manner. Should it appear that the picture is not properly framed it is only necessary to move the handle 80 up or down as indicated in Figs. 6 to 8, until it is seen that the picture is properly framed. When an insert of reading matter is projected and the special perforation 106 reaches the brush, the solenoid is energized and the sprockets disconnected from the drive mechanism and arrested. Should it happen that the arresting of the sprockets takes place when the picture is not properly framed, it is only necessary to move the handle 80 as above described.

After the insert of reading matter has been exposed long enough, the operator pulls down upon the handle 99 or opens the switch 114.

It should be understood that I do not limit or restrict myself to the details of combination and construction shown and described, as there may be modification and variation thereof without departing from the spirit of my invention or exceeding the scope of the claims.

I claim as my invention:

1. A motion picture projecting machine comprising, with a motion picture film having insert portions, means for feeding said film, insert stop mechanism for stopping the film at a desired point for a desired period of time, and means for moving said mechanism, said mechanism comprising sprocket-means for engaging the film and clutch means for engaging the sprocket means.

2. A motion picture projecting machine comprising, with a motion picture film having insert portions, means for moving said film with a step-by-step motion, motion picture film insert stop mechanism whereby the film is stopped at a desired point for a desired period of time to expose the insert portion of said film, means for framing provided with an exposure opening, and means for registration of the insert portion of said film with said exposure opening by movement of the film.

3. A motion picture projecting machine comprising, with a motion picture film having insert portions, means for moving said film with a step-by-step motion, motion picture film insert stop mechanism whereby the film is stopped at a desired point for a desired period of time to expose the insert portion of said film, means for framing provided with an exposure opening, and means for registration of the insert portion of said film with said exposure opening by movement of the film after step-by-step movement thereof is stopped.

4. A motion picture projecting machine comprising, a motion picture film, a film gate, means for feeding said film with a step-by-step motion past the film gate, motion picture film stop mechanism for stopping the film for a desired period of time in front of the film gate, means for moving said mechanism, and framing means for registration of the exposed portion of the film with the film gate by movement of the film after step-by-step movement thereof is stopped.

5. A motion picture projecting machine comprising, a motion picture film having insert portions, a film gate, means for feeding said film with a step-by-step motion past the film gate, motion picture film insert stop mechanism for stopping the film at an insert point for a desired period of time in front of the film gate for exposing the insert portion, means for moving said mechanism, and framing means for registration of the insert portion of the film with the film gate by movement of the film after step-by-step movement thereof is stopped.

6. A motion picture projection machine comprising, with a motion picture film having insert portions, insert stop mechanism for stopping the film at a desired point for a desired period of time, and means for moving said mechanism; said mechanism comprising means for engaging the film and clutch means for engaging said film-engaging means.

7. A motion picture projecting machine comprising, with a motion picture film, a film gate, means for feeding said film with a step by step motion past the film gate, motion picture film stop mechanism for stopping the film at a desired point for a desired period of time in front of the film gate, means for moving said mechanism, and framing means for registration of the exposed portion of the film with the film gate after the film is stopped; said means for framing comprising sprocket means for engaging the film and clutch means for engaging the sprocket means.

8. A motion-picture projecting machine comprising, with a motion picture film having insert portions, a film gate, means for feeding said film with a step by step motion past the film gate, motion picture film insert stop mechanism for stopping the film at an insert point for a desired period of time in front of the film gate, means for moving said mechanism, and framing means for registration of the insert portion of the film with the film gate after the film is stopped; said means for framing comprising sprocket means for engaging the film and clutch means for engaging the sprocket means.

9. A motion picture projecting machine comprising, with a motion picture film, a film gate, means for feeding said film with a step by step motion past the film gate, motion picture film stop mechanism for stopping the film at a desired point for a desired period of time in front of the film gate, means for moving said mechanism, and framing means for registration of the exposed portion of the film with the film gate after the film is stopped; said means for framing comprising a rotatable frame, a sprocket for engaging the film, clutch means engageable with said sprocket, and means for rotating said frame.

10. A motion picture projecting machine comprising, with a motion picture film having insert portions, a film gate, means for feeding said film with a step by step motion past the film gate, motion picture film insert stop mechanism for stopping the film at an insert point for a desired period of time in front of the film gate, means for moving said mechanism, and framing means for registration of the insert portion of the film with the film gate after the film is stopped; said means for framing comprising a rotatable frame, a sprocket for engaging the film, clutch means engageable with said sprocket, and means for rotating said frame.

11. A motion picture projecting machine comprising, a motion picture film provided with sprocket perforations and with perforations located out of the path of the sprocket perforations, means comprising sprockets for moving said film with a step by step motion, means for disconnecting said means for moving, and means for operating said disconnecting means engageable with said perforations located out of the path of said sprocket perforations.

12. A motion picture projecting machine comprising, a motion picture film provided with perforations located out of the path of the sprocket perforations and between the path of the sprocket perforations and the adjacent edge of the film, means comprising sprockets for moving said film with a step by step motion, means for disconnecting said means for moving, and means for operating said disconnecting means engageable with said perforations located out of the path of said sprocket perforations.

13. In a motion picture projecting machine having motion picture film insert stop mechanism, a motion picture film having insert portions and provided with sprocket perforations and with perforations located out of the path of said sprocket perforations for coöperating with said insert stop mechanism.

14. In a motion picture projecting machine having motion picture film insert stop mechanism, a motion picture film having insert portions, and provided with sprocket perforations and with perforations located out of the path of said sprocket perforations and between the path of the sprocket perforations and the adjacent edge of the film for coöperating with said insert stop mechanism.

15. A motion picture projecting machine comprising, with a motion picture film having insert portions, means for feeding said film with a step by step motion, insert stop mechanism for stopping the film at a desired point for a desired period of time, and means for moving said mechanism; said mechanism comprising sprocket-means for engaging the film and clutch means for engaging the sprocket means.

16. A motion picture projecting machine comprising, with a motion picture film having insert portions, means for feeding said film with a step by step motion, insert stop mechanism for stopping the film at a desired point for a desired period of time, and means for moving said mechanism; said mechanism comprising sprocket means for engaging the film and clutch means having pins engageable and disengageable with the sprocket means.

17. A motion picture projecting machine, comprising with a motion picture film having insert portions, a film gate, means for moving said film with a step by step motion past the film gate, insert mechanism for stopping the film at a desired point for a desired period of time in front of the film gate, and means for moving said mechanism; said mechanism comprising a sprocket means for engaging the film and clutch means for engaging the sprocket means.

18. A motion picture projecting machine comprising, with a motion picture film having insert portions, a film gate, means for feeding said film with a step by step motion past the film gate, insert stop mechanism for stopping the film at a desired point for a desired period of time in front of the film gate, and means for moving said mechanism; said mechanism comprising sprocket means for engaging the film and clutch means having pins engageable and disengageable with said sprocket means.

19. A motion picture projecting machine comprising, with a motion picture film having insert portions, a film gate, means for feeding said film with a step by step motion past the film gate, motion picture film insert stop mechanism having means for stopping the film at a desired point for a desired period of time in front of the film gate comprising a sprocket for engaging the film, means for moving said insert stop mechanism, means for registration of the exposed portion of the film with the film gate, and means for operating the means for registration; said means for registration comprising the sprocket of said insert stop mechanism, and a rotatable frame for said sprocket.

20. A moving picture projecting machine comprising, with a motion picture film having insert portions, a film gate, means for moving said film with a step by step motion past the film gate, motion picture film insert stop mechanism for stopping the film at an insert point for a desired period of time in front of the film gate comprising a sprocket for engaging the film and a clutch for engaging said sprocket, means for moving said mechanism, means for registration of the insert portion of the film with the film gate, and means for operation of the means for registration; said means for registration comprising the sprocket and clutch of the insert stop mechanism and a rotatable frame for said sprocket and clutch.

21. A motion picture projecting machine comprising, with a motion picture film having insert portions, a film gate, means for feeding said film with a step by step motion past the film gate, motion picture film insert stop mechanism for stopping the film at an insert point for a desired period of time in front of the film gate comprising a sprocket for engaging the film and a clutch collar having pins engageable and disengageable with said sprocket, means for moving said mechanism, and means for registration of the insert portion of the film with the opening of the film gate; said means for registration comprising the above mentioned sprocket and clutch collar of the insert stop mechanism, a rotatable frame for said sprocket and clutch collar, and means for rotating said frame.

22. A moving picture projecting machine comprising, with a motion picture film having insert portions, a film gate, means for feeding said film with a step by step motion past the film gate, insert stop mechanism for stopping the film at a desired point for a desired period of time in front of the film gate comprising sprocket means for engaging the film and clutch means for said sprocket means, means for moving said mechanism, means for registration of the film with the opening of the film gate, and means for operation of the means for registering, said means for registration comprising the sprocket and clutch means of the insert stop mechanism, a rotatable frame for said sprocket and clutch means, and means for rotating said frame.

23. A moving picture projecting machine comprising, with a motion picture film having insert portions, a film gate, means for feeding said film with a step by step motion past the film gate, insert mechanism for stopping the film at a desired point and for a desired period of time in front of the film gate comprising sprocket means for engaging the film and clutch means having pins engageable and disengageable with said sprocket means, means for moving said mechanism, and means for registration of the film with the opening of the film gate; said means for registration comprising the above mentioned sprocket and clutch means of the insert stop mechanism, a rotatable frame for said sprocket and clutch means, and means for rotating said frame.

24. In a motion picture projecting machine, the combination of a Geneva drive having a countershaft; a rotating frame mounted for movement coaxially with said shaft; a sprocket shaft rotatably mounted in said frame; an operative connection between said countershaft and said sprocket shaft; a rotating collar fixed on the sprocket shaft; a fixed gear disposed coaxially with said frame, and held against rotation; a gear collar loosely mounted on said sprocket shaft and meshing with the fixed gear; a sprocket wheel loosely mounted on said shaft; and means for connecting said sprocket wheel to one or the other of said collars.

25. In a motion picture projecting machine, the combination of a sprocket shaft; means for driving the sprocket shaft; a fixed means separate from said sprocket shaft; a sprocket wheel loosely mounted on said shaft; and means for connecting said sprocket wheel to said shafts or to said fixed means.

26. In a motion picture projecting machine, the combination of a sprocket shaft; a rotating collar fixed to said shaft; a loose collar loosely mounted on said sprocket shaft and held against rotation therewith; a sprocket wheel loosely mounted on said shaft between said collars; means for connecting said sprocket shaft with one or the other of said collars; and means for rotating said shaft.

27. In a motion picture projecting machine, the combination of a sprocket shaft; means for rotating said shaft; a pair of collars on said shaft, each of which is provided with a perforation, one of the collars being loosely mounted on the shaft, and the other fixed to the shaft; means for holding the loosely mounted collar against rotation with said shaft; a sprocket wheel loosely mounted on said shaft and comprising a reduced intermediate portion, and enlarged end portions, each provided with a perforation adapted to register with a perforation of said collars; a clutch collar slidably mounted on said reduced portion, and provided with oppositely projecting pins engaging in said perforations of the enlarged ends, and adapted to engage in either one or the other of the perforations of said collars; and means for shifting said clutch collar.

28. In a motion picture projecting machine, the combination of a sprocket shaft; means for rotating said shaft; a pair of collars on said shaft each of which is provided with a perforation, one of the collars being loosely mounted on the shaft, and the other fixed on the shaft; means for holding the loosely mounted collar against rotation; a sprocket wheel loosely mounted on said shaft and comprising a pair of identical end portions each consisting of an enlarged end portion, and a smaller portion, each end portion being provided with a perforation adapted to register with a perforation of the collars and a sleeve tightly receiving said smaller portions and forming a reduced intermediate portion of the sprocket; a clutch collar slidably mounted on said reduced portion and provided with oppositely projecting pins engaging in perforations of said enlarged ends and adapted to engage in either one or the other of the perforations of said collars; and means for shifting said clutch collar.

29. In a motion picture projecting machine, the combination of a sprocket shaft; means for rotating said shaft; a pair of collars on said shaft, each of which is provided with a perforation, one of the collars being loosely mounted on the shaft and the other fixed to the shaft; means for holding the loosely mounted shaft against rotation with the shaft; a sprocket wheel loosely mounted on said shaft and comprising a reduced intermediate portion and enlarged end portions, each provided with a perforation adapted to engage with said collars; a clutch collar slidably mounted on said reduced portions and provided with an intermediate annular groove and with oppositely projecting pins adapted to engage in said perforations of the enlarged ends and said collars; and a lever having a finger adapted to engage in said annular groove and shift said clutch collar longitudinally of said reduced portions.

30. In a motion picture projecting machine, the combination with the main frame, the Geneva casing thereon, the Geneva drive and countershaft of said drive; of a rotating frame mounted on said casing coaxial with said countershaft; a sprocket shaft mounted in said frame eccentric to said countershaft and having geared connection with said countershaft; a hand lever fulcrumed on said main frame; a link connecting said lever with said rotating frame for partially rotating the latter; a sprocket loosely mounted on said sprocket shaft and having a reduced middle portion and enlarged end portions provided each with a perforation; a fixed gear disposed in said frame coaxial with said countershaft and fixed against rotation; a geared collar loosely mounted on said sprocket shaft and meshing with said fixed gear and provided with a perforation adapted to register with the perforation of one enlarged end of the sprocket; a rotating collar fixed to said sprocket shaft and having a perforation adapted to register with the perforation of the other enlarged end of the sprocket; a clutch collar rotatably and slidably mounted on said reduced portion and provided at its middle part with an annular groove; pins projecting from said clutch collar, and adapted to respectively engage in the registering perforations at opposite ends of the sprocket; and means engaging in said annular groove for shifting the clutch collars.

31. In a motion picture projecting machine the combination of a sprocket shaft, a sprocket wheel on said shaft comprising identical end portions, each portion consisting of an enlarged end portion and a smaller portion fixedly attached thereto, and a sleeve tightly receiving said smaller portions and forming a reduced intermediate portion of the sprocket.

32. A motion picture projecting machine, comprising a plurality of sprocket shafts driven by the main gear transmission, sprockets loosely mounted on said shafts, and means for simultaneously connecting or disconnecting all the sprockets from said main gear transmission shaft.

33. In a motion picture projecting machine, the combination of a plurality of sprockets over which the film passes; a shutter; mechanism for operating said sprockets and shutter; a clutch disposed between each sprocket and said mechanism and comprising a slidable clutch collar adapted when moved longitudinally of the clutch to connect or disconnect said clutch from said mechanism and provided with an annular groove; levers each having a finger engaging in one of said annular grooves respectively; and a bar connected to all of said levers for simultaneously operating the clutches.

34. In a motion picture projecting machine, the combination of a plurality of sprocket shafts; means for driving said shafts; a pair of collars on each shaft, each of which is provided with a perforation, one of the collars being loosely mounted on the shaft, and the other fixed to the shaft; means for holding the loosely mounted collar against rotation with the shaft; a sprocket wheel loosely mounted on each shaft and comprising a reduced intermediate portion and enlarged end portions each provided with a perforation adapted to register with a perforation on said collars; a clutch collar slidably mounted on said reduced portion and provided with an annular groove and with oppositely projecting pins engaging in said perforations of the enlarged ends and adapted to engage in either one or the other of the perforations of said collars; a lever associated with each clutch collar and each provided with a finger engaging in the annular groove thereof; and a bar connected to all of said levers for simultaneously operating the lever.

35. A motion picture projecting machine comprising, with motion picture film and means for feeding such film, a film gate, mechanism for moving film past the film gate, a shutter, means for operating said mechanism and shutter, means for suspending the operation of said mechanism while the shutter still operates, and a film having contact perforation located between the edge of the film and the sprocket perforations thereof for operation of the suspending means.

36. In a motion picture projecting machine, the combination of a film gate; mechanism for passing a film past said gate; means for operating said mechanism; a film having contact perforation located between the edge of the film and the sprocket perforations therethrough; electric means for bringing about the suspension of said mechanism; electric contacts adapted to be held out of contact with each other by said film and to establish contact with each other through said perforation; and means associated with said contacts and said electric means for bringing about the operation of the electric means when said contact is made through said perforation.

37. In a motion picture projecting machine, the combination of a film feeding means; means for driving said feeding means; a clutch disposed between said means for connecting or disconnecting the same; a solenoid; a core adapted to be drawn into said solenoid; a film having contact perforation located between the edge of the film and the sprocket perforations therethrough; a pair of electric contacts adapted to contact each other through said perforation; a source of current; and conductors connecting said source of current, said solenoid, and said contacts in series.

38. A motion picture projecting machine comprising, a motion picture film and means for moving such film, a film gate, mechanism for moving the film past the film gate, means for operating said mechanism, and means for suspending the operation of said mechanism; said film having sprocket perforations and contact perforations located out of the path of the sprocket perforations for contact through the contact perforations of means for operation of the suspending said means.

39. In a motion picture projecting machine, the combination of a film feeding means; means for driving said feeding means; a clutch disposed between said means for connecting or disconnecting the same; a solenoid; a core adapted to be drawn into said solenoid; a film having contact perforation located between the edge of the film and the sprocket perforations therethrough; a pair of electric contacts adapted to contact each other through said perforation; a source of current; conductors connecting said source of current, said solenoid, and said contacts in series; and a handle on said solenoid.

40. In a motion picture projecting machine, the combination of a film guiding means; a plurality of sprockets; means for driving the sprockets; a film adapted to pass through said guiding means and provided with a series of perforations engaging the teeth of the sprockets and with a control perforation at the edge of the film outside of the path of said series; a pair of contacts adapted to make connection with each other when in registry with said control perforation and adapted to be, by the film, held out of contact with each other when not in registry with said control perforation; a source of current; electrically operated means for disconnecting the sprockets from the driving means; and conductors for connecting said electrically operated means, said source of current, and said contacts in a series.

41. In a motion picture projecting machine, the combination of a plurality of sprocket shafts; means for driving the sprocket shafts; sprockets carried on said shafts respectively; a fixed collar loosely mounted on each shaft and provided with a perforation; a rotatable collar rigidly mounted on the sprocket shaft and provided with a perforation; a clutch collar slidably mounted on said sprocket shaft and having an annular groove and provided with pins adapted to engage in one or the other of said perforations; shifting levers engaging in said annular grooves respectively; a connecting bar connecting said shifting levers; a core on said bar; a solenoid adapted to draw said core; a film adapted to pass over said sprocket and provided with a control perforation outside of the path of the perforations engaging the teeth of the sprocket; a pair of contacts adapted to make connection with each other when in registry with said control perforations; a source of current; and conductors for connecting said solenoids, said source of current, and said contacts in series.

42. In a motion picture projecting machine, the combination of a feeding means; means for driving said feeding means; a clutch for connecting or disconnecting said feeding and driving means disposed between the same; a solenoid; a core adapted to be drawn into said solenoid; a film having sprocket perforations and characteristic perforations located out of the path of the sprocket perforations; a pair of electric contacts adapted to contact each other through said characteristic perforations; a source of said current; conductors connecting said source of current, said solenoid and said contacts in series; and a switch in one of said conductors.

WILLIAM C. ALBERS.

Witnesses:
ALBERT F. PIERCE,
H. D. PENNEY.